(12) United States Patent
Rider et al.

(10) Patent No.: US 7,461,158 B2
(45) Date of Patent: Dec. 2, 2008

(54) SYSTEM AND METHOD FOR CONTROLLING ACCESS RIGHTS TO NETWORK RESOURCES

(75) Inventors: Kenneth D. Rider, Colorado Springs, CO (US); Daniel Ferrin, Colorado Springs, CO (US); Ted Post, Colorado Springs, CO (US)

(73) Assignee: Intelliden, Inc., Colorado Springs, CO (US)

( * ) Notice: Subject to any disclaimer, the term of this patent is extended or adjusted under 35 U.S.C. 154(b) by 431 days.

(21) Appl. No.: 10/637,072

(22) Filed: Aug. 7, 2003

(65) Prior Publication Data

US 2006/0173999 A1  Aug. 3, 2006

Related U.S. Application Data

(60) Provisional application No. 60/401,578, filed on Aug. 7, 2002.

(51) Int. Cl.
*G06F 15/16* (2006.01)
*G06F 15/173* (2006.01)
*G06F 15/177* (2006.01)

(52) U.S. Cl. ...................... 709/229; 713/153

(58) Field of Classification Search .............. 726/3; 709/200–203, 217–230; 713/150–160
See application file for complete search history.

(56) References Cited

U.S. PATENT DOCUMENTS

| | | | |
|---|---|---|---|
| 4,991,089 A | 2/1991 | Shorter | |
| 5,109,486 A | 4/1992 | Seymour | |
| 5,159,685 A | 10/1992 | Kung | |
| 5,442,791 A | 8/1995 | Wrabetz et al. | |
| 5,475,819 A | 12/1995 | Miller et al. | |
| 5,491,820 A | 2/1996 | Belove et al. | |
| 5,506,966 A | 4/1996 | Ban | |
| 5,519,704 A | 5/1996 | Farinacci et al. | |
| 5,535,335 A | 7/1996 | Cox | |
| 5,557,748 A | 9/1996 | Noris | |
| 5,659,746 A | 8/1997 | Bankert | |
| 5,680,551 A | 10/1997 | Martin | |
| 5,724,509 A | 3/1998 | Starkweather et al. | |

(Continued)

FOREIGN PATENT DOCUMENTS

EP    0 384 339 A2    8/1990

(Continued)

OTHER PUBLICATIONS

ISM Customer—Aware™ Deep Discovery™; CoManage Corporation; As of Dec. 5, 2000 (2 pages).

(Continued)

*Primary Examiner*—Haresh N Patel
(74) *Attorney, Agent, or Firm*—Cooley Godward Kronish LLP

(57) ABSTRACT

A system and method for securing access to network resources are described. One embodiment includes an exemplary method for securing access to a network element and can include associating a network element with a set of data, and configuring a portion of the data to be responsive to a first subset of access rights. In accordance with other embodiments, an exemplary method and system provide for selection of an appropriate security to govern access by a user to network resources.

12 Claims, 11 Drawing Sheets

U.S. PATENT DOCUMENTS

| | | |
|---|---|---|
| 5,751,965 A | 5/1998 | Mayo |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |
| 5,812,768 A | 9/1998 | Page |
| 5,819,028 A | 10/1998 | Manghirmalani et al. |
| 5,819,042 A | 10/1998 | Hansen |
| 5,832,503 A | 11/1998 | Malik et al. |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,878,432 A | 3/1999 | Misheski |
| 5,884,028 A | 3/1999 | Kindell et al. |
| 5,889,943 A | 3/1999 | Ji |
| 5,889,953 A | 3/1999 | Thebaut et al. |
| 5,901,320 A | 5/1999 | Takahashi |
| 5,920,701 A | 7/1999 | Miller et al. |
| 5,923,850 A | 7/1999 | Barroux |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |
| 5,980,078 A | 11/1999 | Krivoshein et al. |
| 5,999,948 A | 12/1999 | Nelson |
| 6,006,035 A | 12/1999 | Nabahi |
| 6,014,697 A | 1/2000 | Lewis |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,058,480 A * | 5/2000 | Brown ........................ 726/6 |
| 6,085,253 A | 7/2000 | Blackwell |
| 6,088,804 A | 7/2000 | Hill |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fukui |
| 6,154,776 A | 11/2000 | Martin |
| 6,167,445 A | 12/2000 | Gai et al. |
| 6,170,009 B1 | 1/2001 | Mandal et al. |
| 6,170,011 B1 | 1/2001 | Macleod Beck et al. |
| 6,173,312 B1 | 1/2001 | Atarashi |
| 6,175,920 B1 * | 1/2001 | Schanze ..................... 713/150 |
| 6,182,094 B1 | 1/2001 | Humpleman et al. |
| 6,198,479 B1 | 3/2001 | Humpleman et al. |
| 6,202,090 B1 | 3/2001 | Simone |
| 6,211,877 B1 | 4/2001 | Steele |
| 6,226,654 B1 | 5/2001 | Van Hoff |
| 6,240,458 B1 | 5/2001 | Gilbertson |
| 6,243,747 B1 | 6/2001 | Lewis et al. |
| 6,243,815 B1 | 6/2001 | Antur |
| 6,247,049 B1 | 6/2001 | Scott |
| 6,253,240 B1 | 6/2001 | Axberg |
| 6,260,072 B1 | 7/2001 | Rodriguez-Moral |
| 6,269,398 B1 | 7/2001 | Leong et al. |
| 6,272,526 B1 | 8/2001 | Robinson |
| 6,286,038 B1 | 9/2001 | Reichmeyer |
| 6,324,647 B1 * | 11/2001 | Bowman-Amuah ........... 726/23 |
| 6,338,149 B1 | 1/2002 | Ciccone |
| 6,349,306 B1 | 2/2002 | Malik et al. |
| 6,356,955 B1 | 3/2002 | Hollberg et al. |
| 6,363,411 B1 | 3/2002 | Dugan et al. |
| 6,363,421 B2 | 3/2002 | Barker |
| 6,370,119 B1 | 4/2002 | Basso et al. |
| 6,374,293 B1 | 4/2002 | Dev |
| 6,381,631 B1 | 4/2002 | Van Hoff |
| 6,393,425 B1 | 5/2002 | Kelly |
| 6,418,468 B1 | 7/2002 | Ahlstrom et al. |
| 6,426,959 B1 | 7/2002 | Jacobson |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,449,646 B1 | 9/2002 | Sikora |
| 6,453,255 B1 | 9/2002 | Smorodinsky |
| 6,466,580 B1 | 10/2002 | Leung |
| 6,470,453 B1 | 10/2002 | Vilhuber |
| 6,473,775 B1 | 10/2002 | Kusters |
| 6,496,843 B1 | 12/2002 | Getchius et al. |
| 6,496,858 B1 | 12/2002 | Frailong |
| 6,539,425 B1 | 3/2003 | Stevens et al. |
| 6,546,416 B1 | 4/2003 | Kirsch |
| 6,564,056 B1 | 5/2003 | Fitzgerald |
| 6,567,406 B1 | 5/2003 | Skemer |
| 6,571,285 B1 | 5/2003 | Groath |
| 6,598,177 B1 | 7/2003 | Jones |
| 6,609,108 B1 | 8/2003 | Pulliam et al. |
| 6,615,166 B1 | 9/2003 | Guheen et al. |
| 6,615,218 B2 | 9/2003 | Mandal |
| 6,625,590 B1 | 9/2003 | Chen et al. |
| 6,628,304 B2 | 9/2003 | Mitchell |
| 6,636,877 B1 | 10/2003 | Doleac et al. |
| 6,643,289 B1 | 11/2003 | Natanson |
| 6,654,799 B1 | 11/2003 | Tanaka |
| 6,658,526 B2 | 12/2003 | Nguyen et al. |
| 6,678,370 B1 | 1/2004 | Freebersyser |
| 6,678,827 B1 | 1/2004 | Rothermel et al. |
| 6,684,241 B1 | 1/2004 | Sandick |
| 6,684,244 B1 | 1/2004 | Goldman et al. |
| 6,725,233 B2 | 4/2004 | Froyd et al. |
| 6,725,262 B1 | 4/2004 | Choquier |
| 6,725,264 B1 | 4/2004 | Christy |
| 6,732,175 B1 | 5/2004 | Abjanic |
| 6,738,910 B1 | 5/2004 | Genty |
| 6,760,761 B1 | 7/2004 | Sciacca |
| 6,760,767 B1 | 7/2004 | Miesbauer |
| 6,766,369 B1 | 7/2004 | Haitsuka |
| 6,769,116 B1 | 7/2004 | Sexton |
| 6,772,206 B1 | 8/2004 | Lowry |
| 6,775,698 B1 | 8/2004 | Simone |
| 6,782,474 B1 | 8/2004 | Ylonen |
| 6,810,427 B1 | 10/2004 | Cain |
| 6,816,897 B2 | 11/2004 | McGuire |
| 6,826,597 B1 | 11/2004 | Lonnroth et al. |
| 6,832,247 B1 | 12/2004 | Cochran |
| 6,834,298 B1 | 12/2004 | Singer |
| 6,847,994 B1 | 1/2005 | Akimoto |
| 6,865,673 B1 | 3/2005 | Nessett |
| 6,871,232 B2 * | 3/2005 | Curie et al. ................. 709/225 |
| 6,887,667 B2 * | 5/2005 | Loeb ........................... 435/6 |
| 6,895,431 B1 | 5/2005 | Bero |
| 6,895,588 B1 | 5/2005 | Ruberg |
| 6,907,572 B2 | 6/2005 | Little |
| 6,931,016 B1 | 8/2005 | Andersson |
| 6,931,444 B2 | 8/2005 | Schweitzer |
| 6,938,079 B1 | 8/2005 | Anderson |
| 6,959,332 B1 | 10/2005 | Zavalkovsky |
| 6,978,301 B2 | 12/2005 | Tindal |

| | | | |
|---|---|---|---|
| 6,990,591 | B1 | 1/2006 | Pearson |
| 7,003,560 | B1 | 2/2006 | Mullen |
| 7,016,955 | B2 | 3/2006 | Martin |
| 7,127,526 | B1 | 10/2006 | Duncan |
| 7,145,871 | B2 | 12/2006 | Levy |
| 2001/0034771 | A1 | 10/2001 | Hutsch |
| 2001/0053991 | A1 | 12/2001 | Bonabeau |
| 2002/0007284 | A1* | 1/2002 | Schurenberg et al. .......... 705/2 |
| 2002/0007411 | A1 | 1/2002 | Shaked |
| 2002/0032769 | A1 | 3/2002 | Barkai et al. |
| 2002/0032775 | A1 | 3/2002 | Venkataramaiah |
| 2002/0032871 | A1 | 3/2002 | Malan |
| 2002/0038320 | A1 | 3/2002 | Brook |
| 2002/0051080 | A1 | 5/2002 | Tanaka |
| 2002/0052719 | A1 | 5/2002 | Alexander |
| 2002/0069143 | A1 | 6/2002 | Cepeda |
| 2002/0072956 | A1 | 6/2002 | Willems |
| 2002/0078068 | A1 | 6/2002 | Krishnaprasad |
| 2002/0078382 | A1 | 6/2002 | Sheikh |
| 2002/0143927 | A1 | 10/2002 | Maltz |
| 2002/0161863 | A1 | 10/2002 | McGuire |
| 2002/0169858 | A1 | 11/2002 | Bellinger |
| 2002/0173997 | A1 | 11/2002 | Menard |
| 2002/0174091 | A1 | 11/2002 | Froyd et al. |
| 2002/0191619 | A1 | 12/2002 | Shafer |
| 2002/0194289 | A1 | 12/2002 | Engel |
| 2002/0198974 | A1 | 12/2002 | Shafer |
| 2003/0016685 | A1 | 1/2003 | Berggreen |
| 2003/0018702 | A1 | 1/2003 | Broughton |
| 2003/0018765 | A1 | 1/2003 | Muhlestein |
| 2003/0033589 | A1 | 2/2003 | Reyna et al. |
| 2003/0037040 | A1 | 2/2003 | Beadles et al. |
| 2003/0048287 | A1 | 3/2003 | Little et al. |
| 2003/0061312 | A1 | 3/2003 | Bodner |
| 2003/0065919 | A1 | 4/2003 | Albert |
| 2003/0074408 | A1* | 4/2003 | Clark et al. ................. 709/206 |
| 2003/0084009 | A1 | 5/2003 | Bigus |
| 2003/0105648 | A1* | 6/2003 | Schurenberg et al. .......... 705/2 |
| 2003/0135508 | A1 | 7/2003 | Chorafakis et al. |
| 2003/0135547 | A1 | 7/2003 | Kent |
| 2003/0158894 | A1 | 8/2003 | Ziserman |
| 2003/0187964 | A1 | 10/2003 | Sage |
| 2003/0200459 | A1 | 10/2003 | Seeman |
| 2003/0233541 | A1* | 12/2003 | Fowler et al. ............... 713/155 |
| 2004/0001493 | A1 | 1/2004 | Cloonan |
| 2004/0015592 | A1 | 1/2004 | Selgas |
| 2004/0024736 | A1 | 2/2004 | Sakamoto |
| 2004/0054690 | A1* | 3/2004 | Hillerbrand et al. ...... 707/104.1 |
| 2004/0078695 | A1 | 4/2004 | Bowers et al. |
| 2004/0225865 | A1 | 11/2004 | Cox et al. |

FOREIGN PATENT DOCUMENTS

| | | |
|---|---|---|
| EP | 745929 A1 | 12/1996 |
| EP | 0952521 A2 | 10/1999 |
| EP | 0 973 296 A2 | 1/2000 |
| EP | 0 993 725 A1 | 4/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| JP | 8139757 A | 5/1996 |
| WO | WO 95/08794 | 3/1995 |
| WO | WO 97/49214 | 12/1997 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

ISM Customer—Aware™ Fault and Performance Management; CoManage Corporation; As of Dec. 5, 2000 (2 pages).

ISM Customer—Aware™ Provisioning; CoManage Corporation; As of Dec. 5, 2000 (2 pages).

ISM Customer—Aware™ Query; CoManage Corporation; As of Dec. 5, 2000 (2 pages).

ISM Customer—Aware™ Service Profiling; CoManage Corporation; As of Dec. 5, 2000 (2 pages).

Kennedy T W: "Network Operations & Management Tool Requirements for the 90s" Proceedings of the Network Operations and Management Symposium (NOMS). Memphis, Apr. 6-9, 1992, New York, IEEE, U.S. vol. 1, 1992, pp. 122-132.

Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044.

Managing Managed Network Services: The Service Provider Blind Spot; Infonetics Research, The Networking Information Source; Jun. 2000 (18 pages).

Torrente, S, et al: "Implementation of the ANSI TIM1.5 GBM-T1. 214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875-884, XP010032227, ISBN: 0-8186-3580-0.

Williams, R. "Web Based Enterprise Management W101" DMTF 1999 Annual Conference, 'Online! Jun. 15-16, 1999, pp. 1-21.

Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.

Deca, Rudy, Cherkaoui, Omar, and Puche, Daniel, *A Validation Solution for Network Configuration*, Jan. 2002, pp. 1-17.

Lonvick, C. The BSD syslog Protocol. RFC 3164 [online], Aug. 2001 [retrieved on Mar. 25, 2002]. Retrieved from the Internet, <url: HTTP://www.ietf.org/rfc/rfc3164.txt>.

Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.

Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.

Finseth, C. An Access Control Protocol, Sometimes called TACACS. RFC 1492 [online], Jul. 1993 [retrieved on Mar. 25, 2002]. Retrieved from the Internet<URL: http://www.cis.ohio-state.edu/cgi-bin/rfc/rfc1492.html>.

Anderson, B.A. TACACS User Identification Telnet Option. RFC 927 [online], Dec. 1984 [retrieved on Mar. 25, 2002]. Retrieved from the Internet <URL: http://www.ietf.org/rfc/rfc0927.txt>.

Rigney, C., et al. Remote Authentication Dial In User Service (RADIUS). RFC 2138 [online], Apr. 1997 retrieved on Mar. 25, 2002. Retrieved from the Internet <URL: http://www.ietf.org/rfc/rfc2138.txt>.

Rigney, C., Radius Accounting. RFC 2139 [online], Apr. 1997 [retrieved on Mar. 25, 2002]. Retrieved from the Internet <URL: http://www.ietf.org/rfc/rfc2139.txt>.

Gold Wire Technology, "Tracking Changes." In *Formulator 1.0 User Guide*, pp. 211-224.

Lewis, L., *"Policy-Based Configuration Management: A Perspective from a Network Management Vendor,"* http://www.simple-times.org./pub/simple-times/issues/8-1.html., pp. 7-27.

Waldbusser, ST., et al., "Policy Based Management MIB," http://www.ietf.org/internet-drafts/draft-ietf-snmpconf-pm-05.txt, pp. 1-102.

Initially Configuring the ATM Switch Router, Cisco, Oct. 19, 2000, pp. 1-42.

Common Information Model—A Developer's Perspective, IEEE, 1998, p. 1.

* cited by examiner

SYSTEM AND METHOD FOR CONTROLLING ACCESS RIGHTS TO NETWORK RESOURCES

PRIORITY

The present application claims priority from commonly owned U.S. patent application No. 60/401,578, filed on Aug. 7, 2002, and entitled *System and Method for Network Device Management*, which is incorporated herein by reference in its entirety for all purposes.

RELATED APPLICATIONS

The present application is related to commonly owned application numbers:

Ser. No. 09/730,864, now U.S. Pat. No. 7,249,170, entitled System and Method for Configuration, Management and Monitoring of Network Resources, filed Dec. 6, 2000;

Ser. No. 09/730,680, now copending, entitled System and Method for Redirecting Data Generated by Network Devices, filed Dec. 6, 2000;

Ser. No. 09/730,863, now copending, entitled Event Manager for Network Operating System, filed Dec. 6, 2000;

Ser. No. 09/730,671, now U.S. Pat. No. 7,054,946, entitled Dynamic Configuration of Network Devices to Enable Data Transfers, filed Dec. 6, 2000;

Ser. No. 09/730,682, now copending, entitled Network Operating System Data Directory, filed Dec. 6, 2000;

Ser. No. 09/799,579, now U.S. Pat. No. 6,978,301, entitled Global GUI Interface for Network OS, filed Mar. 6, 2001;

Ser. No. 09/942,834, now copending, entitled System and Method for Generating a Configuration Schema, filed Aug. 29, 2001;

Ser. No. 09/942,833, now U.S. Pat. No. 7,200,548, entitled System and Method for Modeling a Network Device's Configuration, filed Aug. 29, 2001;

Ser. No. 10/145,868, now U.S. Pat. No. 6,959,329, entitled System and Method for Transforming Configuration Commands, filed May 15, 2002;

Ser. No. 10/213,958, now copending, entitled System and Method for Enabling Directory-Enabled Networking, filed Aug. 7, 2002; and Ser. No. 10/274,785, now copending, entitled System and Method for Managing Network-Device Configurations, filed Oct. 21, 2002, all of which are incorporated herein by reference in their entirety for all purposes.

FIELD OF THE INVENTION

The present invention relates to securing networked communication systems. In particular, but not by way of limitation, the present invention relates to systems and methods for securing access to network resources.

BACKGROUND OF THE INVENTION

Network devices, such as routers and switches, configurations for such devices, and networking infrastructures are becoming increasingly complex. Such complexities require network engineers to know hundreds or thousands of commands and to master different syntaxes and idiosyncrasies for configuring each uniquely manufactured networked device. Because fewer skill network administrators are available to successfully configure network devices manually, suboptimal configuration, maintenance and monitoring of networks typically result. To minimize such deleterious effects, security management techniques have been employed to prevent inadvertent or unauthorized changes to a network's infrastructure.

But as demand increases for greater visibility into the specifics of network and for more flexible and reliable network configurations, the conventional techniques of securing networks are not satisfactory for application with emerging network management technologies. As an example, corporations and other entities increasingly desire to delegate network management responsibilities to managed service providers ("MSPs"). These entities, however, refrain from turning such responsibility over to the MSPs because these entities typically lose complete control of managing their networks as well as adequate visibility into their own network infrastructure.

What is desired is a system and method for overcoming the drawbacks of current network security methodologies and systems to enhance secure access of network elements.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention, in the Abstract or in the Detailed Description. One skilled in the art can recognize that there are numerous modifications, equivalents and alternative constructions that fall within the spirit and scope of the invention as expressed in the claims.

The present invention can provide a system and method for securing network devices and network-device configurations. In one embodiment according to the present invention, a method of securing access to an element of a network can include associating a network element with a set of data, and configuring a portion of the data to be responsive to a first subset of access rights.

In another embodiment, a exemplary method selects an appropriate security set to secure an access to a network element. This method can include discovering a number of security sets, where each security set includes a specific access right relevant to the access, identifying at least two security sets where the specific access right is in conflict, and resolving the conflict between the at least two security sets.

In yet another embodiment, a exemplary system secures an access to a network element by using a security set repository configured to store a number of security sets. The system is further configured to maintain a hierarchical data structure. Also included is a directory configured to store a number of configuration records and a security manager configured to select an appropriate security set. A user then can access a network element in accordance with the appropriate security set.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
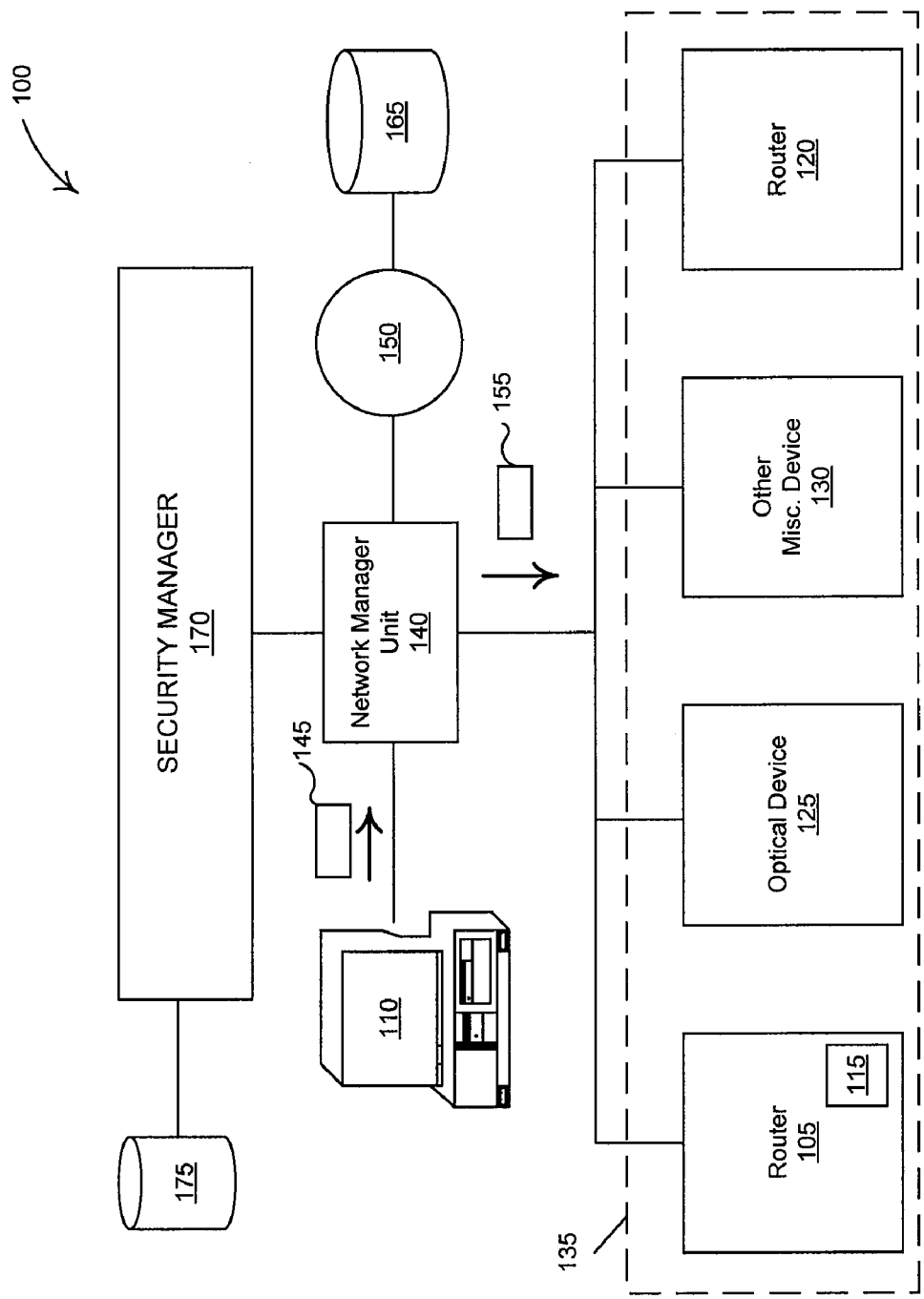
FIG. 1 illustrates an exemplary system for securing a networked communication system, in accordance with one embodiment of the present invention.

FIG. 1 illustrates an exemplary system for securing access to a networked communication system, and in particular, to a network of devices in accordance with one embodiment of the present invention. System 100 includes a network manager unit 140 coupled between a user 110 and devices 105, 120, 125, 130 (collectively 135), which can include routers, optical devices, firewalls, LAN/WAN switches, interfaces, etc., as well as any device-specific processes (e.g., software) or information, such as actual configuration data stored in memory 115 of router 105. Network manager unit 140 also is coupled to directory 165 (connected via network 150) and security manager 170. Security manager 170 is coupled to security set repository 175, which includes or more data structures for facilitating storage and access of security definitions in accordance with some embodiments of the present invention.

In operation, user 110 provides device-generic instructions 145 to network manager unit 140 irrespective of the heterogeneous nature of network devices 135. The device-generic instructions can include an indication to configure a device over a network (or subnetwork), a request to perform a device-specific process, or other like network instructions. In response to device-generic instructions 145, network manager unit 140 generates and communicates device-specific instructions 155 to a target network device for implementation.

Security manager 170 governs the ability of user 110 to effectuate the generation of device-specific instructions 155. In particular, security manager 170 can permit communication of device-specific instructions 155 to network device. But it also can restrict or completely deny communication of such to a network resource. Moreover, security manager 170 can permit, restrict or completely deny a user request to access one or more documents as well as the contents of those documents. A document or a portion thereof can represent a command for, or a configuration of, one of devices 135 such as a router or switch. Security manager 170 governs by determining whether a particular user has access rights to a specific network resource, a particular document or only a portion of a document. Access rights of user 110 can include, but are not limited to "view," "add," "modify," and "delete." In accordance with the present invention, user 110 can be any principal, or any entity, such as an administrator, engineer, or like network personnel, or a collection of entities.

Security, as described herein, includes at least two tiers of security. The first tier ("tier one") includes a set of rules for providing basic resource security. That is, tier one security defines "who" can operate on a network resource and/or can access a folder or a document. After applying tier one security, exemplary security manager 170 applies a second tier ("tier two") of security. Tier two security includes a set of rules for governing access based on the contents of a document, such as a portion of a configuration record. By restricting access in relation to a document's content, a more fine-grained approach to configuring, managing and monitoring network resources is realized. Hence, tier two security restricts a user to data constituting a portion of an entire document rather than providing complete or no access to that document. For example, FIG. 4A depicts document portion 406 that is accessible. Note that other portions of document 400 are not necessarily accessible to that user.

Figure 5:
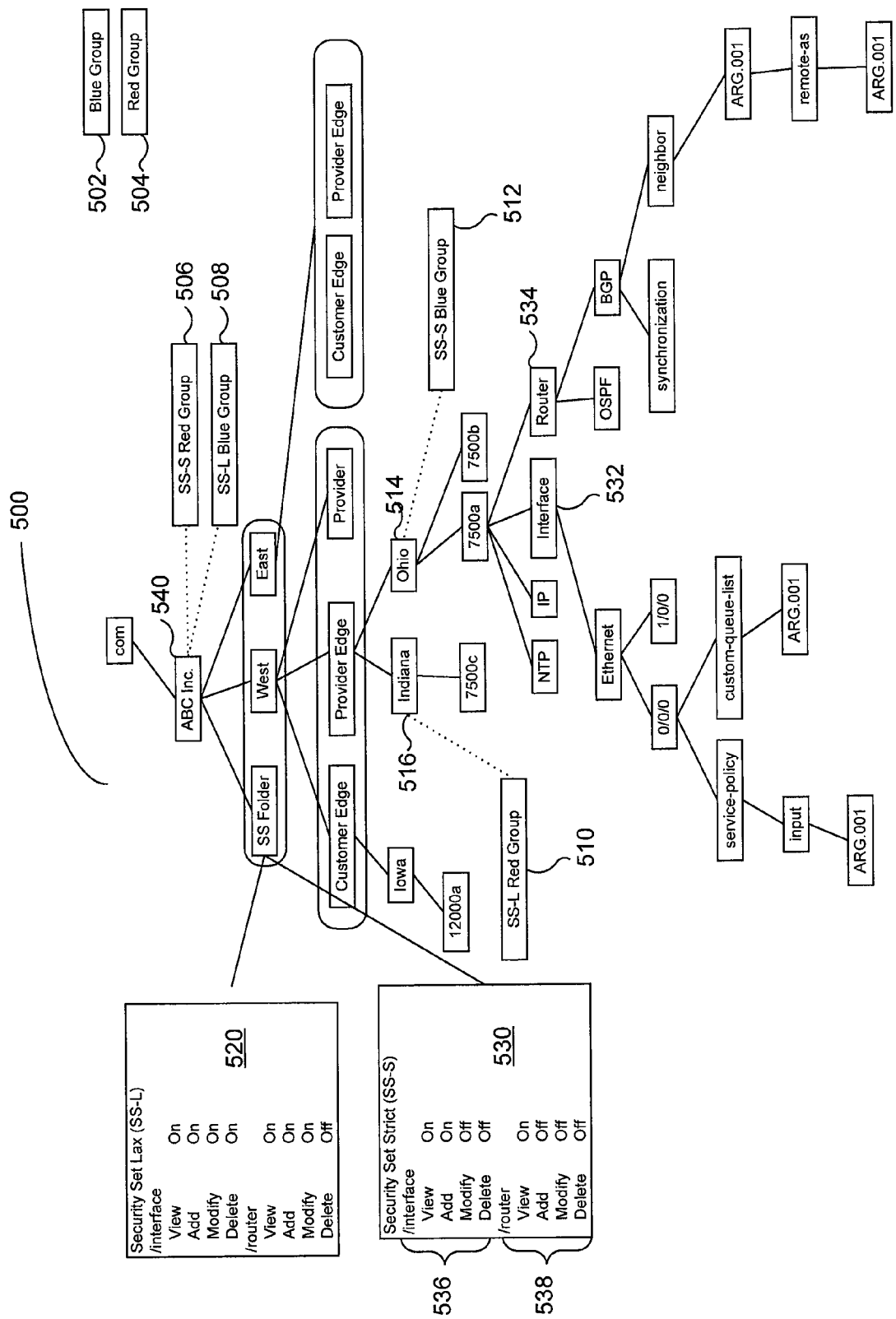
FIGS. 5-9 illustrate exemplary hierarchies of realms and network resources for enforcing security sets in accordance with several embodiments of the present invention.

As described herein, a folder is a container that includes other documents, but also can contain other folders (e.g., subfolders) and/or documents. A folder can represent a "realm," which can be a subset of parent-child relationships of a hierarchical data structure (e.g., a tree structure). An example of a realm is shown in FIG. 5. Realm 514 represents geographically categorized network elements under the name "Ohio." Hence, a folder labeled as "Ohio" can include folders representing subrealms, which can be labeled as such (e.g., a folder label "interface" is subrealm and includes network resources for realm interface 532). Also, two or more realms can include sibling parent-child node relationships of a data structure, if the two or more realms depend from a common ancestor (e.g., a root node). As such, a realm can contain other realms as well as network resources.

Similarly, a folder can also represent a network resource because a network resource can contain a number of network resource configurations. For example, a folder identified as "routers 1-100" can include 100 documents, each document being a configuration file for a uniquely identifiable router (e.g., router #45). A document can also represent a network resource because a document and its contents can be separately related to a hierarchy of network elements. Again, a document or a portion thereof can represent a command for, or a configuration of, a network element such as one of devices 135 (e.g., a router or switch). In some embodiments of the present invention, such relationships between realms, subrealms, documents and document portions can be graphically presented to a user to perform an action in relation to a network resource. Realms can represent geographically-diverse, functionally-diverse, and/or any other type of diverse groups.

Figure 2A:
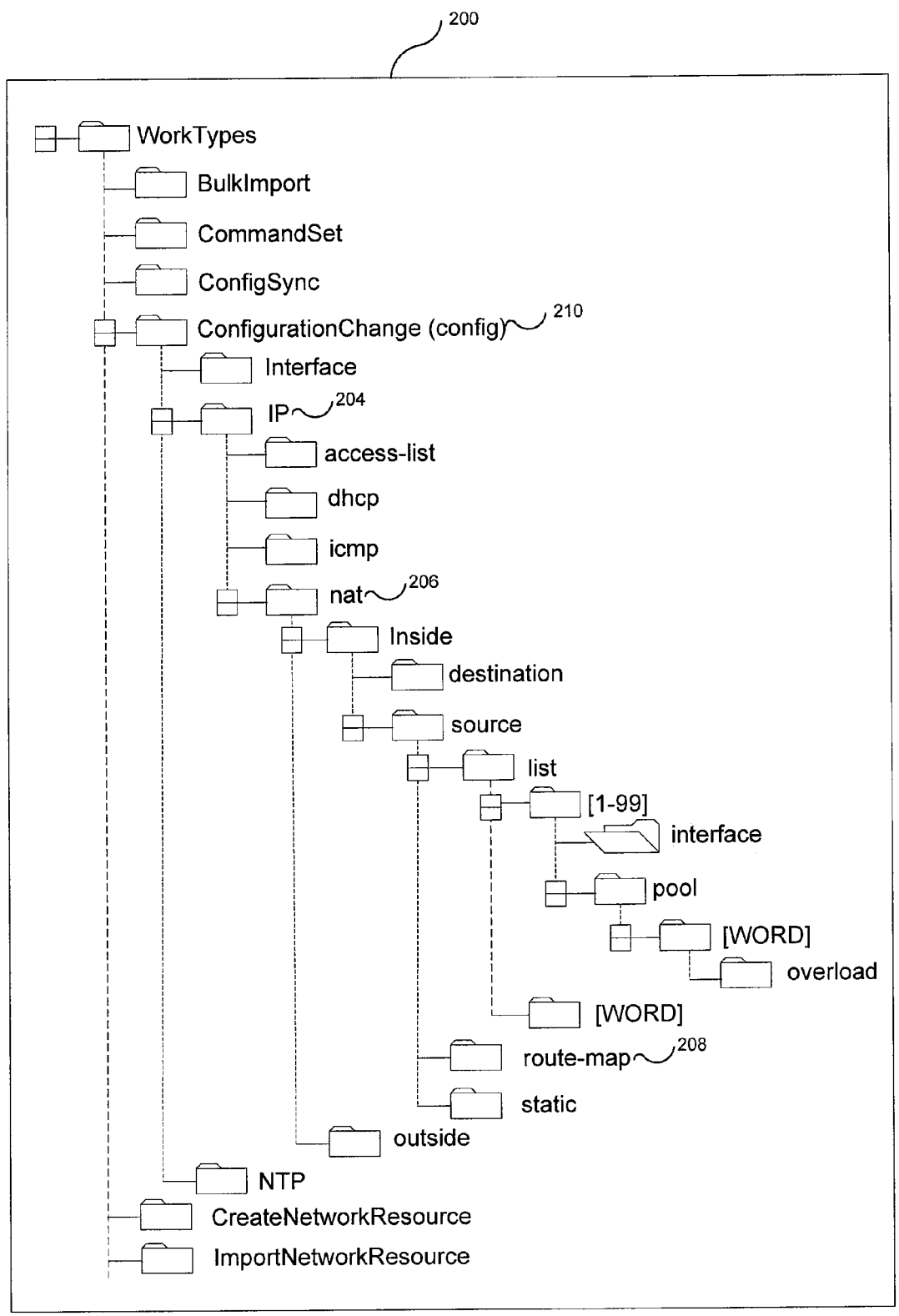
FIG. 2A is a graphical representation of an exemplary data structure in accordance with an embodiment of the present invention.

FIG. 2A is a graphical representation of an exemplary data structure in accordance with an embodiment of the present invention. Windowpane 200 shows hierarchical relationships between nodes of a tree structure. In this example, the nodes are depicted as folders and arranged in parent-child relationships. For example, route-map folder 208 is a subfolder of nat folder 206. Likewise, nat folder 206 is a subfolder of IP folder 204. Hence, folders and documents can be arranged in a hierarchical fashion to have parent-child relationships expressed as a tree-like data structure. In one embodiment, nat folder 206 can represent a "realm" in which subfolder route-map folder 208 resides.

Since access rights can be applied at a folder level, a subfolder can inherit access rights from anything in that same folder or from parent folders. This inheritance scheme applies recursively throughout sub-folders unless a specific sub-folder, or a resource, has its own explicit data access rights. In this case, the sub-folder representing access rights will override the access rights of the parent folders. For example, route-map folder 208 can inherit access rights from IP folder 204, unless, for example, the access rights of nat folder 206 countermand such rights. Furthermore, access rights can be applied at a resource level such that any type of data or a document in system 100 that can be secured explicitly by assigning access rights to that data or document. For example, optical device 125 can be specifically associated with certain limitations on a user's rights, such as "view" only. Tier one security thus governs inherency in relation to resources and realms, but not portions of documents.

Under tier two security, one or more access rights govern the access to one or more portions of a document. As described herein, a "security item" is a set of access rights related to one or more documents or to a folder containing one or more documents. As an example, route-map folder 208 of FIG. 2A can be assigned one or more of the following access rights: "view," "add," "modify," and "delete" portions of at least one document in that folder and/or associated subfolders. Hence, a security item provides the capability of defining access rules to, for example, the actual data (i.e., contents) of a network resource, such as a portion of each of one or more configuration records. In most embodiments, the portion of each of multiple configuration records relate to the same access right. Further, such access rules can be applied to multiple portions of one or more configuration records and/or can be applied to an entire configuration document.

A "security set," as described herein, is a predefined set of security items having data access rights to define the boundaries from which contents of a document can be accessed. A security set is maintained independent of its assignment to users and/or folders. That is, the security set describes neither "who" is permitted to access contents of document nor "what" container of data (e.g., such as a folder) is applicable to what realm. Under tier two security, any security set that does not explicitly assign a permission to a section (i.e., a portion) of a document, then that document inherits permissions from the that realm for that device, or a higher-level realm. The discussion of FIG. 3 describes one example of the inheritance and the explicit assignment of permissions.

Figure 2B:
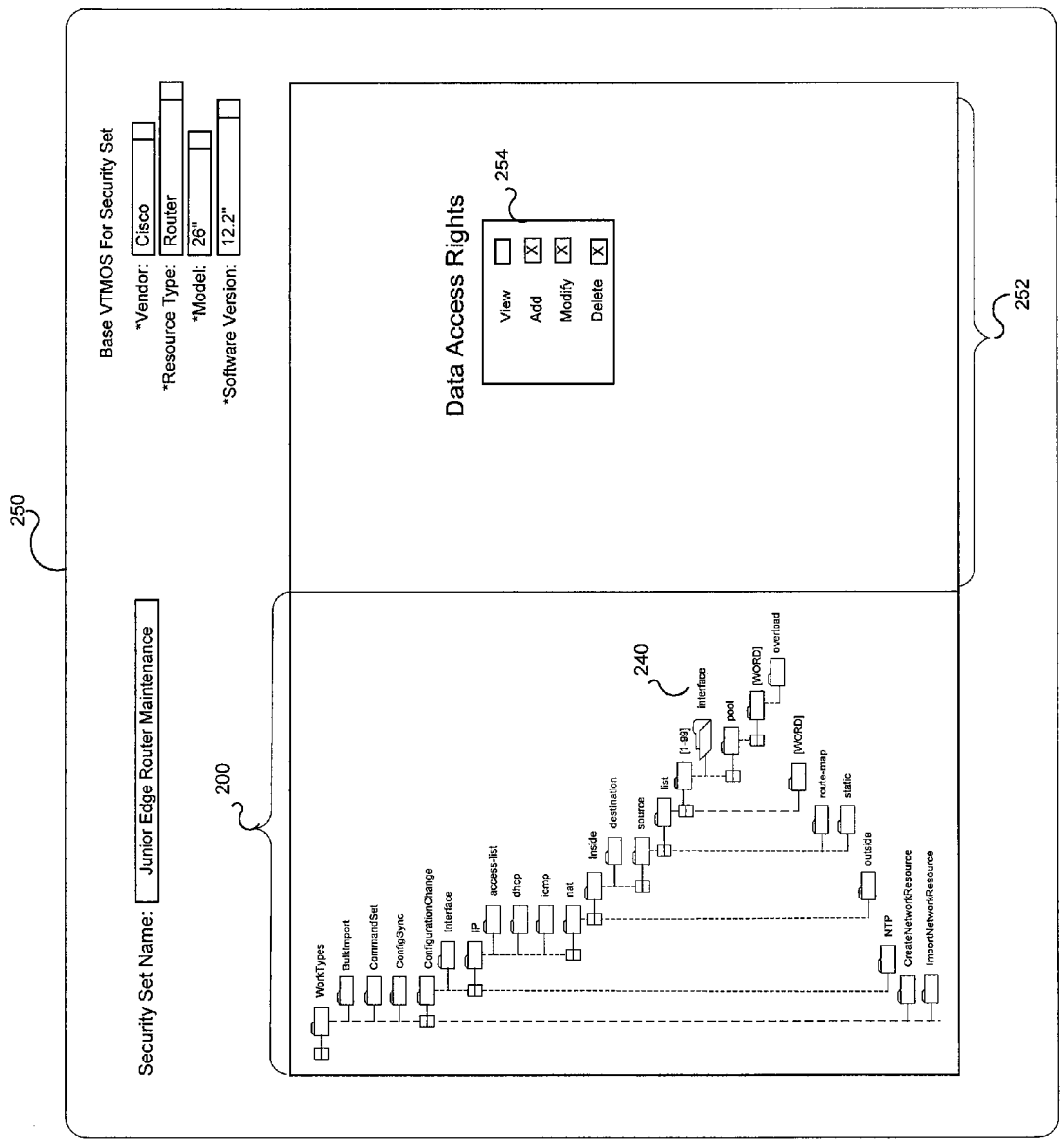
FIG. 2B illustrates an exemplary user interface for assigning access rights to contents of a document in accordance with one embodiment of the present invention.

FIG. 2B illustrates an exemplary user interface for assigning access rights to at least a portion (i.e., contents) of a document in accordance with one embodiment of the present invention. In this instance, a graphical user interface 250 presents to a user a selected interface folder 240 (shown highlighted in black) of windowpane 200. In response to the selection, windowpane 252 presents data access rights 254 to the user. Here, the contents of documents associated with interface folder 240 have "add," "modify," and "delete" access rights. If the user selects to also provide a "view" access right, then by selecting (e.g., selecting the box associated with view) the prohibition to view document contents is overridden.

Figure 3:
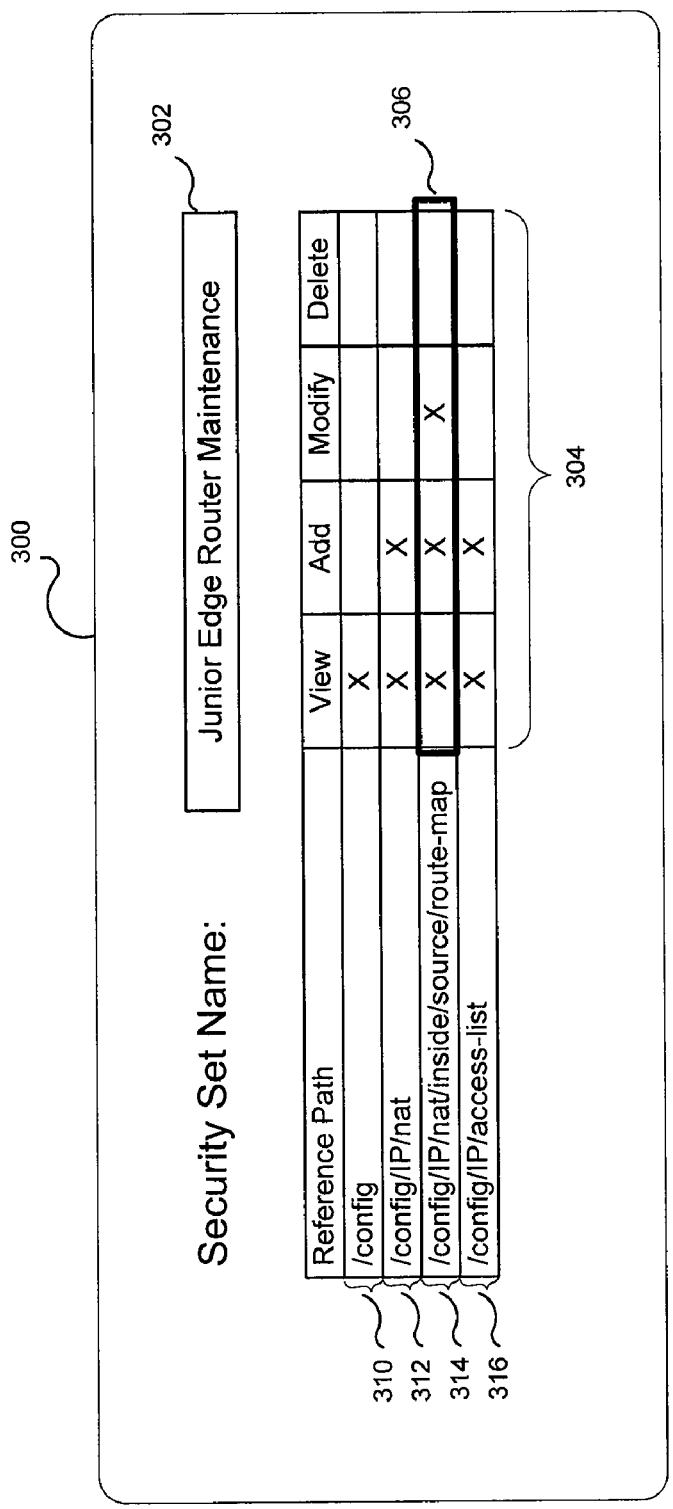
FIG. 3 depicts an exemplary security set including access rights in accordance with one embodiment of the present invention.

FIG. 3 depicts an exemplary security set having one or more access rights in accordance with one embodiment of the present invention. In this example, security set summary 300 graphically shows a set of security items 310, 312, 314 and 316 and associated access rights 304 for each of the security items. "Junior Edge Router Maintenance" is a unique identifier 302 for security set summary 300. For security item 314 having a subset 306 of access rights, the "view" access right can be inherited from a parent folder, such as "configuration change folder" 210 of FIG. 2A (shown as "config" in FIG. 3), which is associated with security item 310. The "add" access right can be inherited from config/IP/nat folder 206, which is associated with security item 312. But, unlike "view" and "add," the "modify" access right of subset 306 is explicitly assigned to security item 314 and thus overrides (i.e., countermands) the inherited prohibition to modify. In some embodiments, exemplary security sets are stored in security set repository 175 of FIG. 1.

FIG. 4A depicts an exemplary document having at least one portion of its contents accessible as defined by at least one security set, according to one embodiment of the present invention. In this example, document 400 is a file representing a configuration record. A configuration record is associated with a network device, such as any of the devices 135 of FIG. 1, and includes data constituting information about the device, executable code, or any other data for configuring, monitoring, and maintaining network resources in a secured manner. As shown, document 400 includes descriptor portion 402 and data portion 404. Descriptor portion 402 can include basic information about the device and its operation whereas data portion 404 can include actual data, which can be employed by specific applications. Portion 406 is a portion of data 404 that has its access governed in accordance with the principles of tier two security as described herein. That is, one or more access rights can be associated with portion 406. Although one portion 406 is shown, an ordinarily skilled artisan will appreciate that the same or other access rights can govern other portions of data portion 404.

Figure 4B:
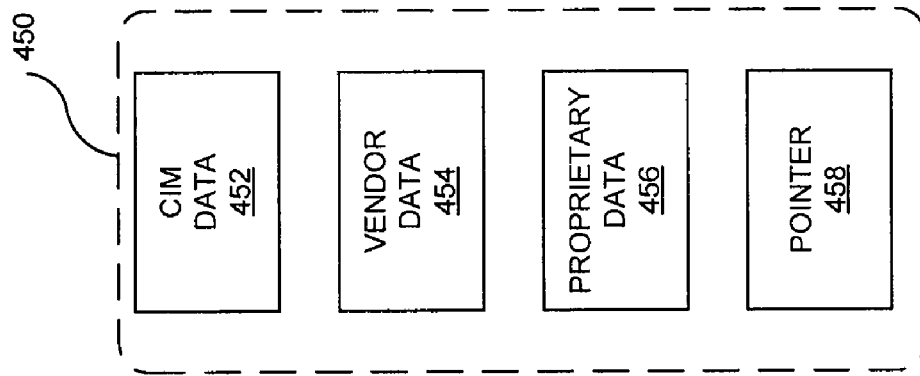
FIG. 4B shows another document in accordance with another embodiment.
Figure 4A:
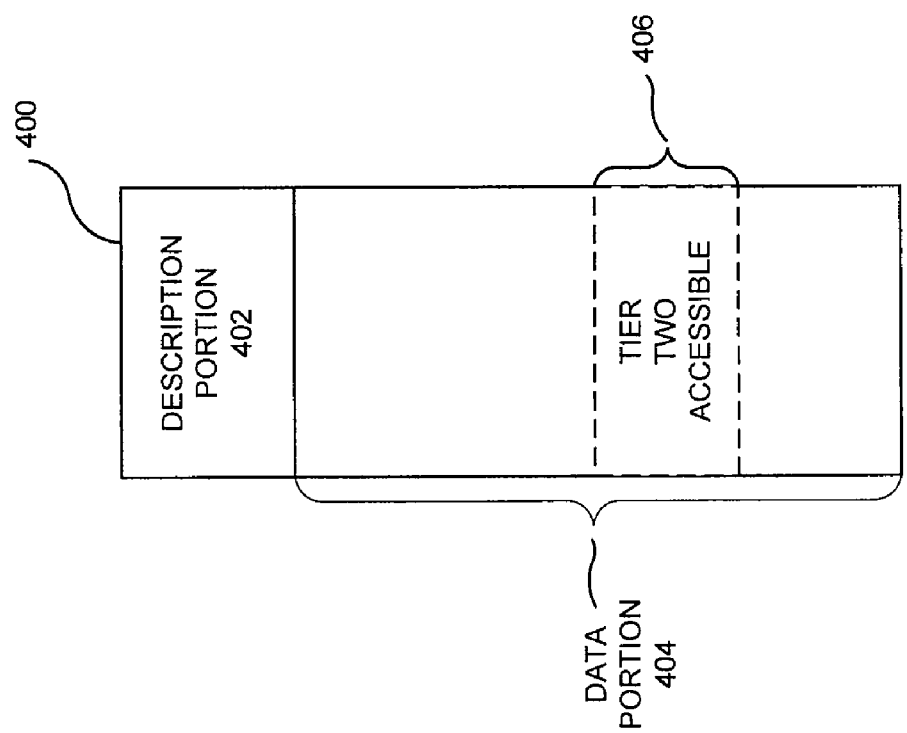
FIG. 4A depicts a document portion having its accessibility defined by a security set, according to one embodiment of the present invention.

FIG. 4B shows another document in accordance with another embodiment. Document 450 is a specific example of a configuration record including CIM data 452, vendor data 454, proprietary data 456, and pointer 458, all of which are described in U.S. patent application Ser. No. 09/730,864, filed Dec. 6, 2000 and entitled System and Method for Configuration, Management and Monitoring of Network Resources. As an example, one or more security sets can be implemented to permit a junior network engineer to view only vendor data portion 454, including an operation system version and manufacturer. The security set can also permit the junior network engineer to both view and modify proprietary data portion 456, including configuration notes and health records. In some embodiments, a single subset of access rights 306 of FIG. 3 is applied to document 450 in its entirety.

FIGS. 5-9 depict the enforcement of security sets in accordance with one embodiment of the present invention. In general, when a user requests access to a resource (i.e., any network device and/or document, or collection thereof), each of the groups that the user is associated with will be retrieved. Then, each security set associated with the user's groups is retrieved. The retrieved security sets can be ordered in a hierarchical-fashion based on the security sets association to a realm. This hierarchical order of security sets can indicate that a resource within a lower-level folder will inherit security from at least one higher-level folder. A security item associated with a lower-level folder, however, can override the access rights specified at the higher-level folder.

A user request can be interrogated against the list of resources to which it could apply. If there is only one resource that is affected, then the first security item up the hierarchy (i.e., associated with the parent node) will provide for the inheritance of the subset of access rights for that resource. For requests that operate over a number of resources, each resource is considered. That is, a hierarchy of resources can be traversed to determine possible security set from which to select for enforcement of a security policy. An example of this is discussed in connection with FIG. 10.

Once a consolidated list of security sets has been computed, the resources operated on by the request must be applied against the security sets. When enforcing tier two security, the most explicit matches are discovered first, and then for all matches found, the most stringent security is applied.

Consider an example where a supervisor, such as a senior engineer, assigns to a subordinate, such as a junior engineer, a subset of access rights to a request for viewing a configuration of a network device, as shown in security set 300 of FIG. 3. When operating on the configuration, the junior engineer can add an "ip/access-list" and a "ip/nat" attribute as indicated in security items 312 and 316, respectively. These two changes match two different reference paths in the security set 300. Further, the junior engineer can modify contents of any document associated with "ip/nat/inside/source/route-map," which includes the most explicitly defined security item. As such, the most explicitly defined security item is generally applied to the document. Notably, the most explicit security definition can take away security access rights because the lack of a data access approval means no rights. Further to FIG. 3, the junior engineer is completely denied an ability to "delete," as is indicated with no explicit permissions to do so.

FIG. 5 is an exemplary hierarchy 500 of realms and network resources to enforce security sets in accordance with one embodiment of the present invention. In this example, security sets "lax" 520 and "strict" 530 define a more lax security set and more strict security access, respectively, where security set "lax" 520 is less restricted in its associated access rights (i.e., permits more access to contents of a document). The two security sets reside in a special folder called the "SS Folder" and are placed in a user-defined realm to restrict access rights to the security set definitions. Furthermore, a user has assigned security set 520 ("SS-L") to blue group 502 to form association 508 ("SS-L Blue Group") with corporate realm 540 ("ABC, Inc."). Notably, a three-way relationship forms between a defined security policy (i.e., tier two), a user, and a folder in the directory.

In this case, members of blue group 502 are afforded more freedom to access network devices as well as document contents over the entire corporate structure. But note that blue group 502 is assigned security set "strict" 530 ("SS-S") to form association 512 with Ohio realm 514. Apparently, the activities of blue group 502 are under more scrutiny in relation to Ohio realm 514. Perhaps this scrutiny is warranted if the corporation's core routers reside in Ohio realm 514. As shown in FIG. 5, security set 530 as applied to Ohio realm 514 explicitly restricts access of the modify, add and delete access rights. For example, "off" indicates an access right is disabled, whereas "on" indicates an access right is enabled. Given that the core routers are in Ohio realm 514, members of blue group 502 can only view router(s) 534 according to security definition 536, but are permitted to view and add interface(s) 532 according to security definition 538.

By contrast, red group 504 has a stricter security set applied at the corporate realm 540 to form association 506. But red group 504 is given a little more freedom in Indiana realm 516 because it is, for example, an area of responsibility of red group 504. So, with this greater responsibility, red group 504 needs greater control in Indiana realm 516. Therefore, red group 504 is given a more lax security set 520 ("SS-L"), but only in Indiana realm 516.

This example, therefore, illustrates the enforcement of security sets in accordance with an embodiment of the present invention. This allows the more-trusted blue group greater access to the whole company, but more limited access to the company's core assets. But the less-trusted red group is granted only limited access to the whole company with greater access to a subrealm for which its members are responsible. And all this is accomplished with the two security sets 520 and 530.

FIGS. 6-9 depict hierarchies of realms and network resources with application of several exemplary security sets to enforce security policies, according to one or more embodiments of the present invention. In connection with FIGS. 6-9, the following discussion describes how an exemplary security manager 170 of FIG. 1 and/or an exemplary method resolves potential conflicts with multiple security sets.

Figure 6:
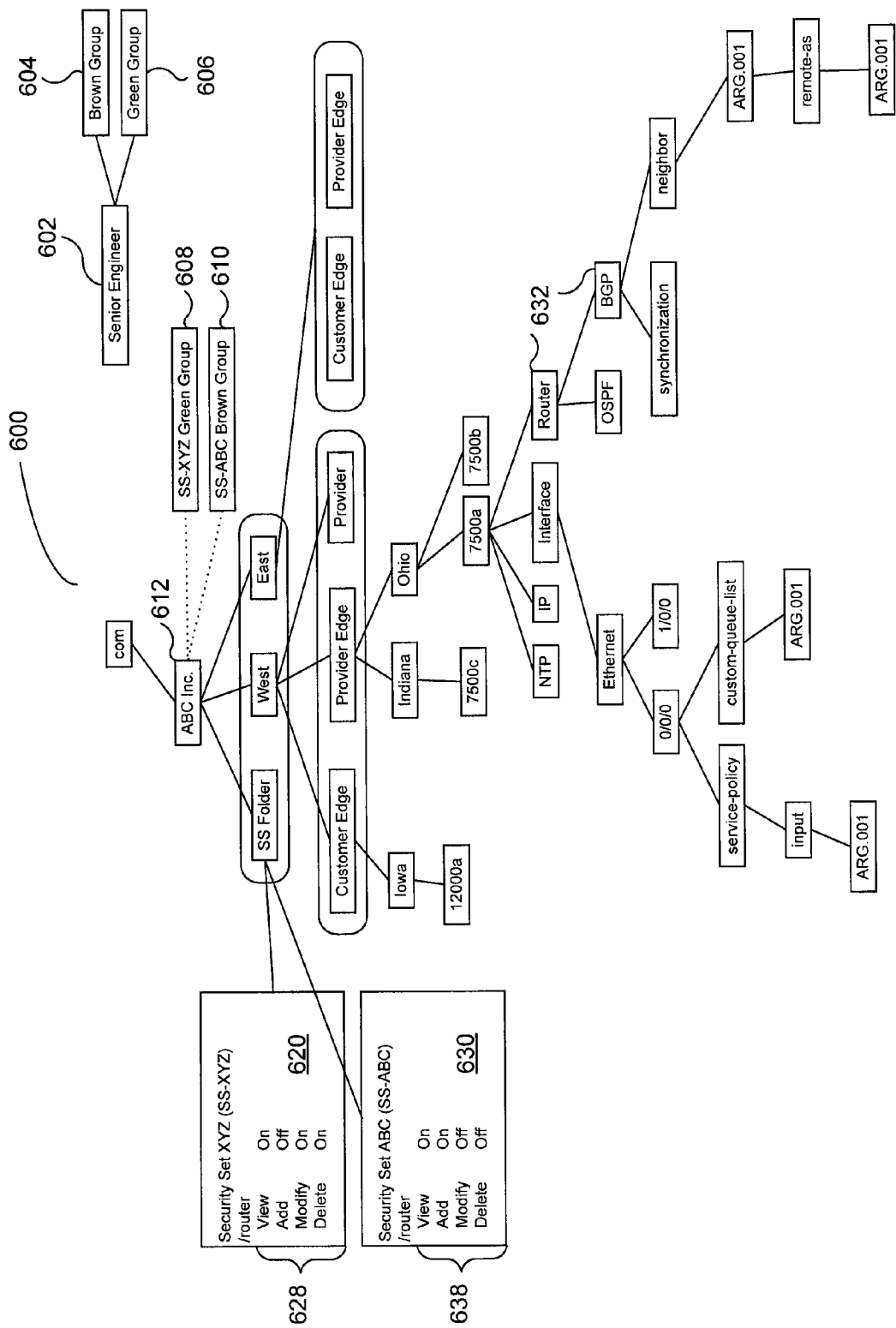

FIG. 6 is an exemplary hierarchy 600 of realms and network resources to enforce security sets in accordance with one embodiment. Consider that a user can have multiple roles. That is, the user can belong to more than one group. And for a specific group, security sets are assigned at any node level in a particular realm hierarchy or even down to a specific network resource as a leaf node. In this instance, a potential for a conflict among security sets exists for a single resource where a user belongs to multiple groups and different security sets are associated with each of the different groups at the location of the network resource in the realm hierarchy. This example is denoted "case I."

As shown in FIG. 6, user 602 belongs to multiple groups: brown group 604 and green group 606. Although these two groups form associations 608 and 610 with the same realm 612, they each have different security sets (due to varying access rights) assigned to a parent realm, from which a particular network resource inherits. Green group 606 has "view," "add," and "delete" access rights 628 (e.g., security set definition) of security set 620 ("SS-XYZ") for the documents contents associated with a router(s), whereas brown group 604 has "view" and "add" access rights 638 of security set 630 ("SS-ABC") for the same section of the document associated with the router(s).

If user 602 makes a "/router/bgp" configuration change at a router document at subrealm 632, security manager 170 of FIG. 1 then determines which one of the multiple groups and their security sets will govern the enforcement of tier two security. Because user 602 has been entrusted to occupy roles in both brown 604 and green 606 groups, the union of the permissive access rights provides for the governing security definition. Therefore, user 602 has the union of all access rights for the combined groups, and thus can view, add, modify, or delete the document contents for a router configuration located at subrealm 632.

Figure 7:
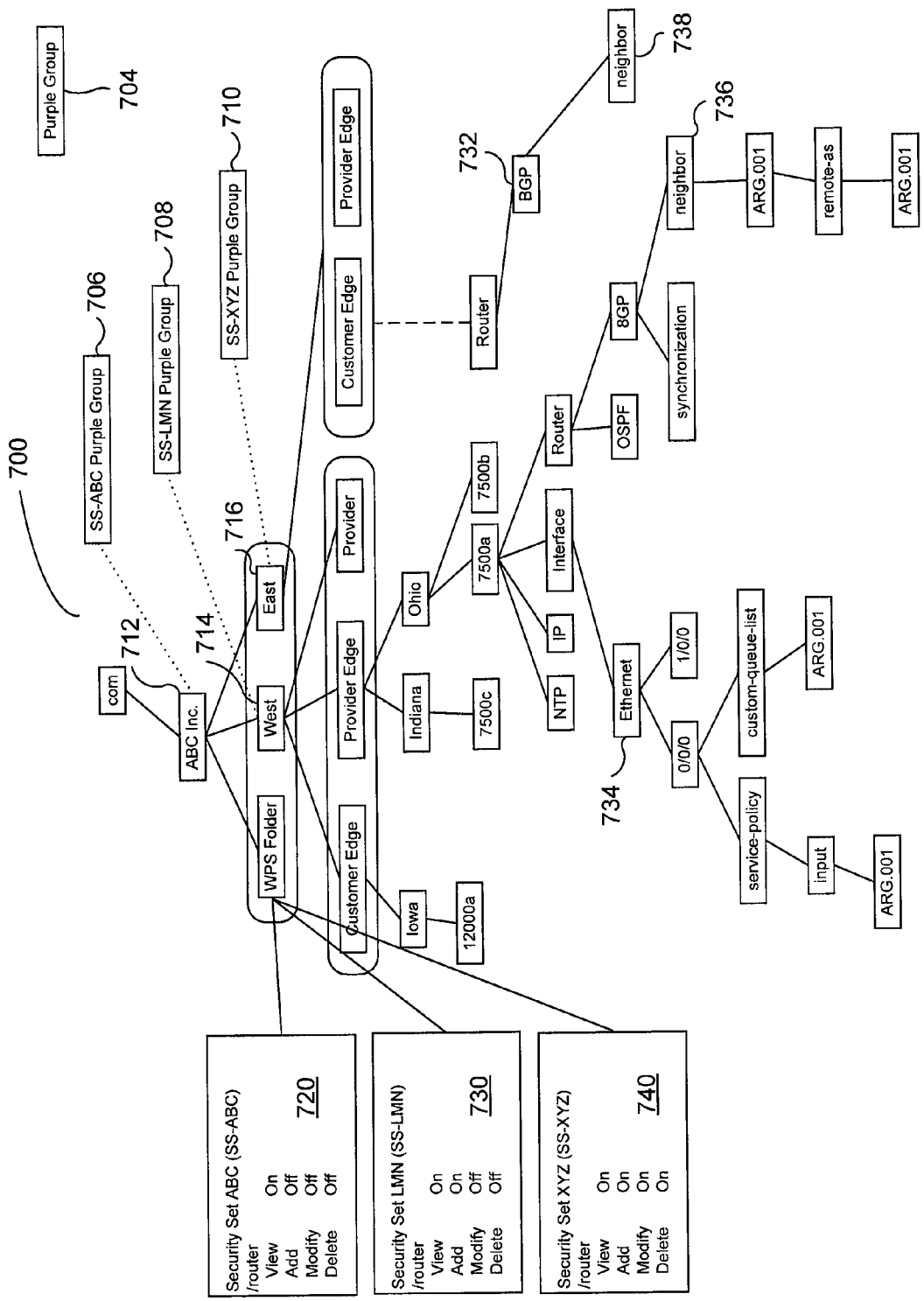

FIG. 7 is an exemplary hierarchy 700 of realms and network resources to enforce security sets in accordance with an embodiment. In this case, consider that a user can have a single role. That is, the user belongs to a single group. And for that specific group, multiple security sets can be assigned at any node level in a particular realm hierarchy. In this instance, a single group has several security sets associated with different realms, over which the user is requesting an action. An example of an action is some type of configuration change. As such, a potential for a conflict exists among security sets assigned to multiple realms when a requested action is asserted over multiple realms because this requires consideration of each of the potentially conflicting security sets. This example is denoted "case II."

As depicted in FIG. 7, a user belongs to a single group—purple group 704. This group forms associations 706, 708 and 710 with realms 712 ("ABC, Inc."), 714 ("West Coast") and 716 ("East Coast"), respectively. Further, realms 712, 714 and 716 are associated with security sets 720 ("SS-ABC"), 730 ("SS-LMN") and 740 ("SS-XYZ"), respectively. Each of the security sets, and more specifically security set 720, allows the entire company to at least have view only access rights for all its documents and/or network resources. In comparison, west coast realm 714 has a littler looser content security set 730, which permits "view" and "add" access rights for purple group 704. East coast realm 716 has the most lenient security set 740, which permits "view," "add," "modify," and "delete" access rights for users of purple group 704. Given that there are multiple security sets assigned to the three different realms, there are several permutations of access rights with which to possibly enforce tier two security.

In another example, consider that a request to "add" a /router/bgp configuration change that affects only in a single realm (which does not include subrealms). To accomplish this action, security manager 170 of FIG. 1 need only determine the access rights of the realm in which the requested action is performed. So, if the user request to modify "/router/bgp" 732 in East Coast realm 716, then that user would be granted the right to modify in accordance with security set 740 because there is no conflict with other realms 712 and 714. However, a conflict arises when the execution of a requested action (e.g., a unit of work) spans multiple realms, such as any combination of two or more of realms 712, 714 and 716. Security manager 170 of FIG. 1 determines which of the three security sets or a combination thereof is applicable to enforce tier two security, such as when a unit of work (e.g., request to "add") spans all three realms. In doing so, securing manager 170 propagates inherited rights from parent to child realms, so long as parent realms are not overridden by explicit rights given (or denied) at one or more lower-realm levels. For example, if corporate realm 712 specifies that a user can modify a /interface/Ethernet network device 734, and the associated subrealm security set (and those of intervening subrealms) does not explicitly change the default security sets of the parent realms, then the right to modify /interface/Ethernet 734 is inherited.

Next, consider that the user requests to add a new "/router/bgp/neighbor" at 736. Security manager 170 of FIG. 1 then determines which one of the access rights should be applied, or alternatively, whether the entire request should be denied. To effectuate this add request, the "add" access right should exist in at least one security set for each of realms 712, 714 and 716. Moreover, the "add" access right cannot necessarily be explicitly turned off at a lower-level of any of realms 712, 714 and 716 and then explicitly turned on at a higher-level realm in the hierarchy. Thus, if even one security set does not allow the proper access right for the requested change, then there will not be the proper access right to complete the whole unit of work. Consequently, security manager 170 will deny the "add" request. This result, however, does not prevent a user from adding a device to both "/router/bgp/neighbor" 736 and "/router/bgp/neighbor" 738 to West Coast 714 and East Coast 716 realms, respectively.

Figure 8:
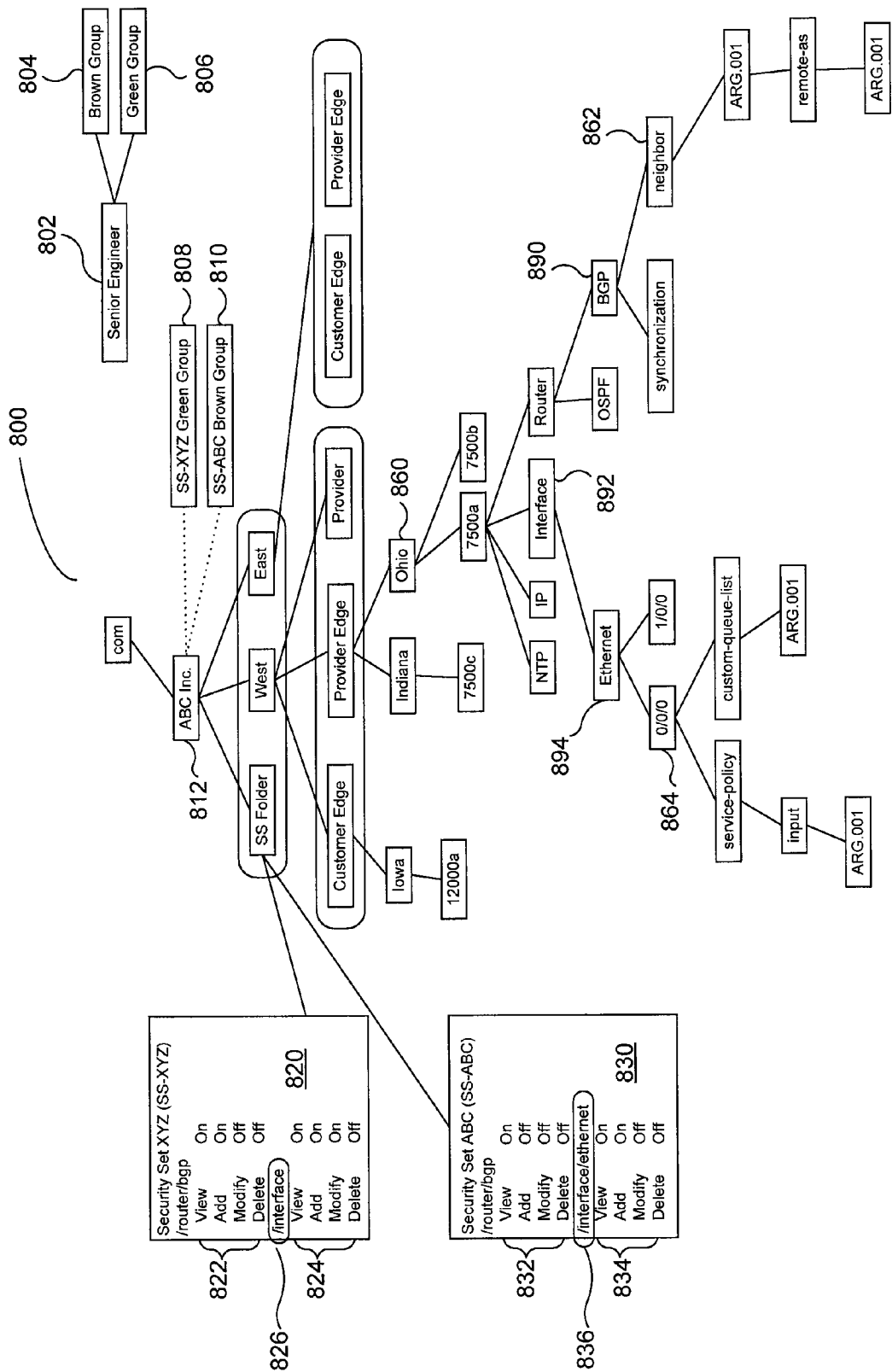

FIG. 8 is an exemplary hierarchy 800 of realms and network resources to enforce security sets in accordance with an embodiment. Consider that a user has a multiple role and thus belongs to more than one group. Also consider that multiple security sets can be assigned at any node level in a particular realm hierarchy. In this instance, at least two groups have at least one security set and each of the realms can inherit one or more security sets from a parent realm. This example is denoted "case III."

FIG. 8 is similar to FIG. 6, except that security sets 820 and 830 include additional access right for an interface(s). In FIG. 8, user 802 inherits security sets 820 ("SS-XYZ") and 830 ("SS-ABC") from green 806 and brown 804 groups, respectively. As an example, consider that a request for a configuration change at a router in Ohio realm 860 is viewed in relation to that realm's inheritance of both security set definitions 822 and 832. In this instance, security set definitions 822 ("/router/BGP") and 832 ("/router/BGP") include a respective explicit "on" and an explicit "off" assigned to the "add" access right for subrealm 890, where a subrealm is any realm located as a child node of any parent node (e.g., realm 812 is a parent realm for subrealm 890).

Given security set definitions 822 and 832, consider first that user 802 requests to add a "/router/bgp/neighbor" instance 862 under subrealm 890 ("BGP"). Although security set definition 832 in SS-ABC denies the "add" access right (i.e., with an explicit "off"), security set definition 822 in SS-XYZ does permit an "add" access right (i.e., with an explicit "on"). In accordance with one embodiment of the present invention, security manager 170 of FIG. 1 will determine that because user 802 was entrusted to have been associated with both groups, security manager 170 will permit user 802 to operate with a greater subset of access rights. That is, a union between the two security set definitions forms a dynamically generated security set having greater access rights. Hence, user 802 has permission to add the new "/router/bgp/neighbor" instance at subrealm 862.

But consider a scenario where user 802 attempts to "modify" a "/interface/Ethernet/0-0-0 interface" at subrealm 864. Here, security set definition 824 shows that for "/interface" 826, an explicit "on" is assigned to the "modify" access right for subrealm 892 ("interface"). Similarly, security set definition 834 shows that for "/interface/Ethernet" 836, an explicit "off" is assigned to the "modify" access right for subrealm 894 ("Ethernet"). Although security set definition 824 of SS-XYZ permits the "modify" access right (i.e., "on") for /interface changes at subrealm interface 892, security set definition 834 of SS-ABC denies that "modify" access right (i.e., "off"). Again, security manager 170 of FIG. 1 will determine whether user 802 has been entrusted to be a member of both groups, and if so (as is the case), user 802 will be authorized to operate with a greater subset of access rights, which can be a union of security sets. Therefore, user 802 will be permitted to modify the existing /interface/Ethernet/0-0-0 interface at 864.

Figure 9:
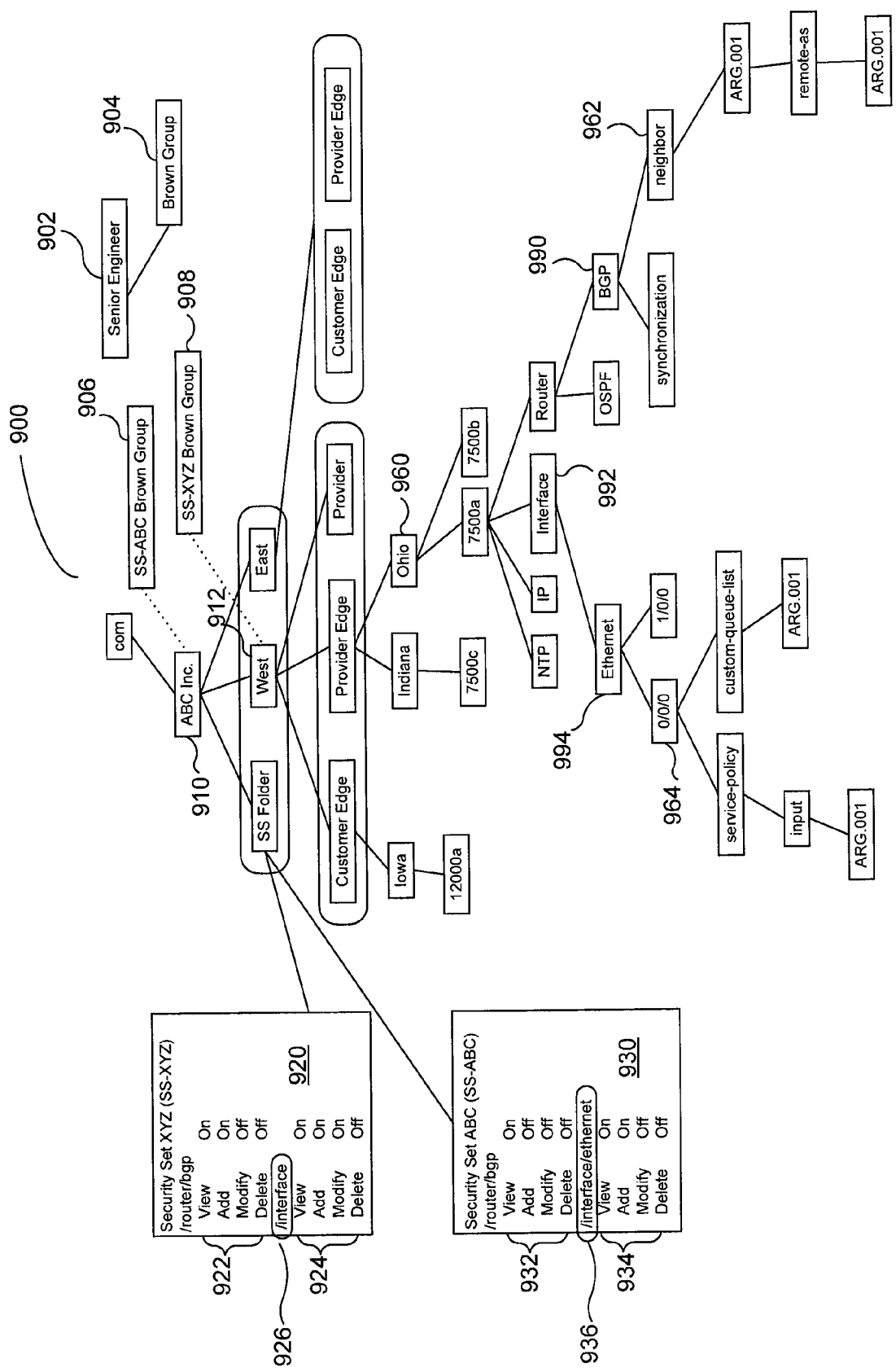

FIG. 9 is an exemplary hierarchy 900 of realms and network resources to enforce security sets in accordance with an embodiment. Lastly, consider that a user is a member of only one group, unlike in FIG. 8, and that the principles of inheritance may impact the application of multiple security sets within the same group, as was the involving requests over multiple realms. This example is denoted "case IV."

As depicted in FIG. 9, a user 902 belongs to a single group—brown group 904. This group forms associations 906 and 908 with realms 910 ("ABC, Inc.") and 912 ("West Coast"), respectively. Further, realms 910 and 912 are associated with security sets 930 ("SS-ABC") and 920 ("SS-XYZ"), respectively, and user 902 inherits security sets 920 ("SS-XYZ") and 930 ("SS-ABC") from respective associations 906 and 908 with brown group 904. As an example, consider that a request for a configuration change at a router in Ohio realm 960 is viewed in relation to that realm's inheritance of both security set definitions 922 and 932. In this instance, security set definitions 922 ("/router/BGP") and 932 ("/router/BGP") include a respective explicit "on" and an explicit "off," both of which are assigned to the "add" access right for subrealm 990 ("/router/BGP"). Given this conflict of security sets, security manager 170 will determine which one will be inherited by, and applied to, subrealm 962 ("neighbor").

Given security set definitions 922 ("/router/BGP") and 932 ("/router/BGP"), consider that user 902 requests to add a "/router/bgp/neighbor" instance 962 under subrealm 990 ("BGP"). Although security set definition 932 in SS-ABC denies the "add" access right (i.e., with an explicit "off"), security set definition 922 in SS-XYZ does permit an "add" access right (i.e., with an explicit "on"). In accordance with one embodiment of the present invention, security manager 170 of FIG. 1 will determine first whether the user is in a single group and not in multiple groups, and second, whether there are multiple security sets from which to inherit security access rights. Then, security manager 170 will accept the access right that has a more explicit path (e.g., "xpath") to the actual configuration change user 902 is attempting to make at subrealm 990.

In this case, multiple security sets 922 and 932 shown in FIG. 9 that the "/router/bgp" access rights are assigned to the same subrealm, namely BGP 990. Again, user 902 belongs to a single group—brown group 904. Therefore, security manager 170 will traverse the hierarchical tree to determine the most explicit path, which is associated with subrealm 912. Here, subrealm 912 grant of access rights to modify countermands and overrides the assigned access right at parent realm 910. Thus, subrealm 912 and its associated security set 922 SS-XYZ governs in enforcing tier two security.

But consider a scenario where user 902 attempts to "modify" a configuration "/interface/Ethernet/0-0-0 interface" at subrealm 964. Here, security set definition 924 shows that for "/interface" 926, an explicit "on" is assigned to the "modify" access right for subrealm 992 ("interface"). Similarly, security set definition 934 shows that for "/interface/Ethernet" 936, an explicit "off" is assigned to the "modify" access right for subrealm 994 ("Ethernet"). Although security set definition 924 of SS-XYZ permits the "modify" access right (i.e., "on") for /interface changes at subrealm interface 992, security set definition 934 of SS-ABC does not permit that "modify" access right (i.e., "off") for subrealm Ethernet 994.

To select an appropriate access right, security manager 170 of FIG. 1 determines first whether user 902 is in a single group, and second, where there are multiple security sets from which to inherit security access rights. In this case, security manager 170 will determine that user 902 is associated with a single group (i.e., the brown group), and also the subrealm 964 where a requested action will be performed will inherit multiple security set definitions 924 and 934. Then, security manager 170 will apply the access right that has a more explicit path (e.g., "xpath") to the actual configuration change user 902 is attempting to make at subrealm 964 ("0/0/0"). In determining which of the security sets will be applied to, and inherited by, subrealm 964, security manager 170 first determines which realm is related to each of security set definitions 924 and 934. Realm 992 ("interface") is associated with security set definition 924, as shown under "/interface" 926, and realm 994 ("Ethernet") is associated with security set definition 934, as shown under "/interface/Ethernet" 936.

Relatively speaking, realm 992 is a parent realm and realm 994 is a child realm (or a subrealm of realm 992). As such, a security set definition associated with realm 994 "as a subrealm" has a "more explicit path" (e.g., xpath) that will override any security set definition set forth in any higher-level realm. Consequently, security set definition 934 of (sub)realm 994, which countermands security set definition of realm 992, will govern whether user 902 can modify a document, for example, at realm 964. Therefore, user 902 will be denied the access to modify a network device configuration, for example, at realm 964.

Figure 10:
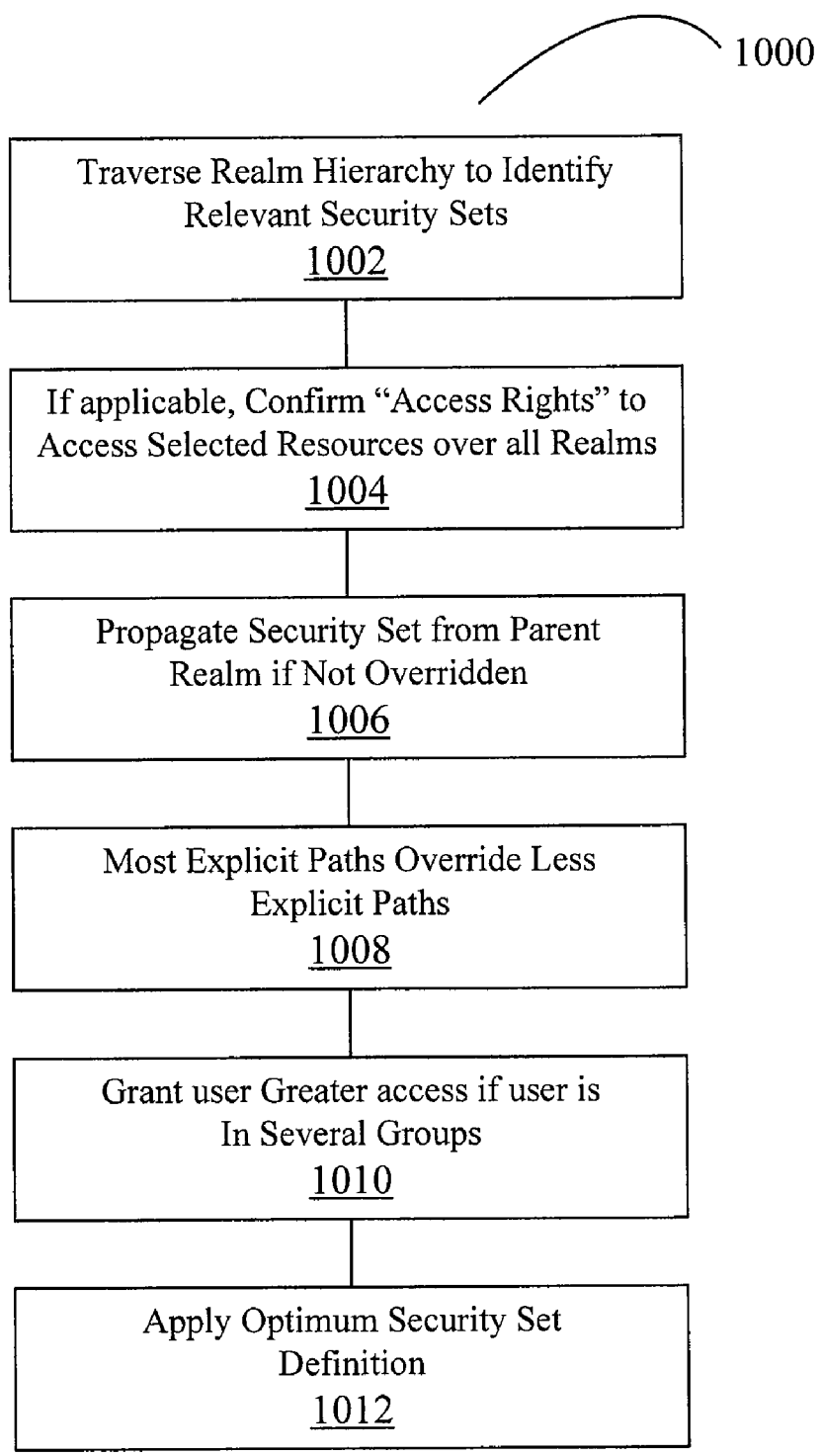
FIG. 10 is a flow diagram showing an exemplary method of determining the manner in which security is enforced in accordance with an embodiment of the present invention.

FIG. 10 is an exemplary flow diagram for at least one of the methods for enforcing tier two security using security set, in accordance with one embodiment of the present invention. In this example, security sets are enforced any time a user requests data from a document, such as a configuration record, or to perform any action requiring an access right, such as add, modify, etc. Thus, the following exemplary method 1000 can commence after a user initiates a request to access a network resource (regardless of whether it is physical, logical, or otherwise).

Exemplary method 1000 begins optionally with block 1002. At block 1002, each security set that is relevant to the request is identified. For example, security set identification can be accomplished by traversing the realm in which the request pertains (e.g., from the node of interest, such as a /router/BGP realm, up to the root node of a hierarchical tree) and by storing the associations of each security set to a particular node (e.g., or realm).

At 1004, a determination is made as to whether a specific, permissive access right associated with the request exists in at least one security set for each realm selected by the user. For example, if the user selects to access a network resource spanning over four realms, then each of the four realms should be associated with at least one security set with a permissive access right. If at least one permissive access right (e.g., "add") exists for each and every selected resource, then it is confirmed that the selected resources over all selected realms. With this confirmation, method 1000 flows to 1006. But if at least one of the selected realms has no permissive access rights of interest, then the user's request is rejected, such as described in connections with case II above.

According to one embodiment of the present invention, 1004 is performed only if applicable. That is, 1004 is applicable if any of the following occurs: the user has selected to access resources over more than one realm (rather than just selecting one realm), the user belongs to a single group and there are multiple security sets spanning over multiple realms, or like criterion is met (see e.g., case II). But otherwise, if 1004 is not applicable, then method 1000 skips 1004 and flows to 1006.

At 1006, an optimum security set will be determined by propagating an associated security set's access rights to the realm in which the user's request will be fulfilled, unless an intervening explicit access right countermands that access rights otherwise inherited from the parent. In other words, a security set is wholly inherited from a parent realm in the absence of any security set assignments to a subrealm. The method then can flow to 1012 to apply the optimum security set if 1008 to 1010 are not applicable.

At 1008, the most explicit path overrides least explicit paths. This can be performed, for example, when a user is a member of only a single group and multiple security sets have been discovered at 1002. Further, at least two of the multiple security sets are each associated with nodes (i.e., realms) residing at different hierarchical levels. The nodes typically associated with the two or more multiple security sets are intervening between the node of interest and the rood node (e.g., see case IV). In a case where the above conditions are met, then the most explicit path (e.g., xpath) overrides the least explicit path, and a security set associated with the most explicit path is used to enforce tier two security. If the following portion 1010 of method 1000 does not apply, then the method can flow to 1012.

At 1010, a user is granted greater access than of the associated, constituent security sets. Greater access is granted by taking the union of the all like access rights to form a security set definition having greater access rights. For example, 1010 is typically performed when a user is a member of more than one group and there are multiple security sets intervening between the node of interest and the rood node (see e.g., cases I and/or III). In a case where the above conditions are met, then the union of relevant access rights form a dynamic security set permitting the user greater access. The method then flows to 1012.

At 1012, at least one of the optimum security set definitions is applied to enforce tier two security in accordance with at least one embodiment of the present invention. Therefore, when a user tries to modify any of the configurations for a target device of network devices 135 of FIG. 1, for example, or tries to add, delete, view, or execute a network device, for example, user 110 will be permitted access to network manager unit 140 to search for and to retrieve a configuration record corresponding to the target network device, but only if the user's request complies at least with tier two security policy. Then, through one or more inputs from the user into a user interface (e.g., a graphical user interface, or GUI), the user is granted access to change the configuration record for that target network device.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using XML, Java, C++, or other object-oriented programming language and development tools. Another embodiment of the invention may be implemented in hardwired circuitry in place of, or in combination with, machine-executable software instructions.

In conclusion, the present invention provides, among other things, a system and method for securing network devices and network-device configurations. Those skilled in the art can readily recognize that numerous variations and substitutions may be made in the invention, its use and its configuration to achieve substantially the same results as achieved by the embodiments described herein. For example, other access rights, such as "open," "execute," "move," etc., and other actions, such as synchronization of files and/or devices, one or more instructions of a command set, etc., can be used to supplement the enforcement of the security set definitions described herein. Accordingly, there is no intention to limit the invention to the disclosed exemplary forms. Many variations, modifications and alternative constructions fall within the scope and spirit of the disclosed invention as expressed in the claims.

What is claimed is:

1. A method of selecting a security set for controlling an access to a network element comprising:
   discovering a plurality of security sets, each security set including an associated access right relevant to the access to the network element;
   identifying at least two of the plurality of security sets where the associated access right of each of the at least two security sets are in a conflict;
   determining whether each of the at least two security sets are associated with two or more groups; and resolving the conflict between the at least two security sets;
   wherein discovering the plurality of security sets further comprises:
      traversing a hierarchical data structure; and determining for each security set an association with a node on the hierarchical data structure;
   wherein resolving the conflict further comprises:
      determining that the at least two security sets are associated with two or more realms;
      analyzing each of the security sets associated with the nodes of each of the two or more realms to determine whether the associated access right exists; and
      rejecting access if none of the security sets associated with at least one of the two or more realms includes the associated access right;
   wherein resolving the conflict further comprises:
      selecting a higher-level node from which to propagate the associated access right if all of the two or more realms includes the associated access right.

2. The method of claim 1 wherein resolving the conflict further comprises:
   determining that the at least two security sets are associated with two or more groups; and
   generating a dynamic security set for selection as the associated security set.

3. The method of claim 2 wherein generating the dynamic security set comprises taking a union of each of the security sets associated with the at least two security sets, wherein the dynamic security set has increased access rights.

4. The method of claim 1 wherein resolving the conflict further comprises:
   determining that the at least two security sets are associated with only one group and that the least two security sets are associated with higher-level nodes;
   identifying one of the at least two security sets as having a more direct path; and
   selecting the identified security set as the associated security set.

5. The method of claim 1 wherein the specific access right is selected from the group consisting of: a view access right, an add access right, a modify access right and a delete access right.

6. The method of claim 1 wherein the access to the network element is requested by a user.

7. The method of claim 1 wherein the network element is a document.

8. The method of claim 1 wherein the network element is a portion of a document.

9. The method of claim 1 wherein the network element is a configuration record.

10. A system for controlling an access to a network element comprising:
   a security set repository configured to store one or more security sets, where a first security set subset of the one or more security sets relates to an associated access right relevant to the access requested by a user, and further configured to maintain a hierarchical data structure having at least one node associated with the first security set subset;
   a directory configured to store one or more configuration records, where at least one configuration record is associated with the at least one node; and a security manager configured to select a security set to govern a request of the user to access the at least one configuration record, the security manager further comprising:
- a discovery module configured to locate the first security set subset where the associated access right is in a conflict with a second security set subset; and
- a resolution module configured to resolve the conflict between the first and second security subsets wherein the security manager further comprises a multiple-realm module configured to determine whether multiple realms are affected by the request of the user and further configured to reject the access if any of the security set subset relate to at least two or more realms that do not include the associated access right.

11. The system of claim 10 wherein the security manager further comprises a dynamic security set module configured to generate a dynamic security set by taking a union of at least two security sets from the security set subset.

12. The system of claim 10 wherein the security manager further comprises a direct path module configured to generate the security set by determining that one of the security set subsets has a more direct path.

* * * * *